United States Patent
Chang

(10) Patent No.: US 8,692,762 B2
(45) Date of Patent: Apr. 8, 2014

(54) DISPLAY APPARATUS FOR PERFORMING SPACE DIVISION AND TIME DIVISION OPERATIONS AND METHOD OF DRIVING THE SAME

(75) Inventor: Jaehyuk Chang, Seongnam-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 892 days.

(21) Appl. No.: 12/758,510

(22) Filed: Apr. 12, 2010

(65) Prior Publication Data
US 2011/0043504 A1    Feb. 24, 2011

(30) Foreign Application Priority Data
Aug. 18, 2009 (KR) ................ 10-2009-0076379

(51) Int. Cl.
*G09G 3/34* (2006.01)
(52) U.S. Cl.
USPC ........................................... 345/109
(58) Field of Classification Search
USPC ............ 345/108, 109, 210; 359/224.1–226.1, 359/233, 290–298
See application file for complete search history.

(56) References Cited

U.S. PATENT DOCUMENTS

| | | | | |
|---|---|---|---|---|
| 4,564,836 A * | 1/1986 | Vuilleumier et al. | ........... | 345/85 |
| 5,233,459 A | 8/1993 | Bozler et al. | | |
| 5,784,189 A * | 7/1998 | Bozler et al. | ........... | 359/254 |
| 5,784,190 A * | 7/1998 | Worley | ........... | 359/291 |
| 5,943,033 A * | 8/1999 | Sugahara et al. | ........... | 345/85 |
| 6,130,656 A * | 10/2000 | Sugahara | ........... | 345/85 |
| 6,618,034 B1 * | 9/2003 | Sugahara et al. | ........... | 345/109 |
| 6,930,660 B2 * | 8/2005 | Amemiya et al. | ........... | 345/85 |
| 6,963,330 B2 * | 11/2005 | Sugahara et al. | ........... | 345/108 |
| 6,972,889 B2 | 12/2005 | Goodwin-Johansson et al. | | |
| 7,471,442 B2 * | 12/2008 | Sampsell | ........... | 359/290 |
| 8,164,232 B2 * | 4/2012 | Kornbluh et al. | ........... | 310/309 |
| 8,243,014 B2 * | 8/2012 | Sampsell | ........... | 345/108 |
| 2001/0043167 A1 * | 11/2001 | Sugahara et al. | ........... | 345/31 |

FOREIGN PATENT DOCUMENTS

| | | |
|---|---|---|
| EP | 1 241 507 B1 | 5/2005 |
| KR | 1020070030871 | 3/2007 |
| KR | 1020070114161 | 11/2007 |
| KR | 1020080013168 | 2/2008 |
| KR | 1020090079718 | 7/2009 |

OTHER PUBLICATIONS

English Abstract for Publication No. 1020070030871, Published Mar. 16, 2007.
English Abstract for Publication No. 1020070114161, Published Nov. 29, 2007.
English Abstract for Publication No. 1020080013168, Published Feb. 13, 2008.
English Abstract for Publication No. 1020090079718, Published Jul. 22, 2009.

* cited by examiner

*Primary Examiner* — Rodney Amadiz
(74) *Attorney, Agent, or Firm* — F. Chau & Associates, LLC

(57) ABSTRACT

In a display apparatus and a method of driving the same, microshutters are successively arranged and each microshutter includes a plurality of sub-microshutters that are opened to transmit light or closed to block light in response to a voltage. The sub-microshutters are opened or closed during predetermined different time periods to display various gray scales.

19 Claims, 10 Drawing Sheets

DISPLAY APPARATUS FOR PERFORMING SPACE DIVISION AND TIME DIVISION OPERATIONS AND METHOD OF DRIVING THE SAME

CROSS-REFERENCE TO RELATED APPLICATION

This application relies for priority upon Korean Patent Application No. 2009-76379 filed on Aug. 18, 2009, the contents of which are herein incorporated by reference in their entirety.

BACKGROUND

1. Technical Field

The present disclosure relates to a display apparatus and a method of driving the display apparatus. More particularly, the present disclosure relates to a display apparatus capable of substantially simultaneously performing both space division and time division operations and a method of driving the display apparatus.

2. Description of Related Art

In order to increase a response speed of a display apparatus, a microshutter display apparatus employing a microshutter has been developed. The microshutter is an example of a microelectromechanical system (MEMS). The microshutter has a physical property that changes its form when an external power source is applied thereto. The microshutter display apparatus transmits or blocks light by using the physical property of the microshutter. Thus, the microshutter display apparatus has a fast response speed with respect to a low driving voltage.

In the display apparatus including the microshutter, it may be difficult to display various gray scales since the microshutter performs only a transmission operation and a blocking operation to the light. More particularly, in order to display a high gray scale, additional microshutters and corresponding wire is needed for each pixel of the display apparatus.

SUMMARY

According to an exemplary embodiment of the present invention, in a method of driving a display apparatus, voltages having different voltage levels are applied to each of a plurality of sub-microshutters of a first microshutter during predetermined different time periods, the voltage levels closing respective ones of the plurality of sub-microshutters.

When a first voltage is applied to a preceding sub-microshutter of the plurality of sub-microshutters to close the preceding sub-microshutter, the preceding sub-microshutter is connected with a succeeding sub-microshutter of the plurality of sub-microshutters. In addition, when a second voltage having a level different from the first voltage is applied to the succeeding sub-microshutter through the preceding sub-microshutter connected with the succeeding sub-microshutter, the succeeding sub-microshutter is closed.

The succeeding sub-microshutter may be closed in response to the second voltage one of after and substantially simultaneously with the closing of the preceding sub-microshutter is closed in response to the first voltage.

The plurality of sub-microshutters may have different sizes from each other. The succeeding sub-microshutter may have a size about two times larger than a size of the preceding sub-microshutter.

The first microshutter and a second microshutter may be independently operated during the predetermined different time periods.

The first and second microshutters may be independently operated by respective thin film transistors.

The first microshutter is connected to a first thin film transistor, and the second microshutter is connected to a second thin film transistor. The first microshutter may include first sub-microshutters, the second microshutter may include second sub-microshutters, and a number of the first sub-microshutters may be equal to a number of the second sub-microshutters.

The succeeding sub-microshutter of the first sub-microshutters may have a size about two times larger than a size of the preceding sub-microshutter of the first sub-microshutters, and the preceding sub-microshutter of the second sub-microshutters may have a size about two times larger than a size of the succeeding sub-microshutter.

The display apparatus may include plural pixels each having at least one microshutter.

According to another exemplary embodiment of the present invention, in a method of driving a display apparatus, voltages having different voltage levels are applied to each of a plurality of sub-microshutters of a first microshutter during predetermined different time periods, the voltage levels closing respective ones of the plurality of sub-microshutters, thereby displaying various different gray scales during a unit time period, wherein a pixel of the display apparatus includes the first microshutter.

The first microshutter and a second microshutter of the pixel are independently operated by respective thin film transistors.

The first and second microshutters are independently operated during the predetermined different time periods.

The first microshutter is connected to a first thin film transistor, the second microshutter is connected to a second thin film transistor, wherein the method comprises receiving a gate signal by a gate line of the pixel, wherein a first data line of the pixel is insulated from the gate line while crossing the gate line to receive a first data signal, and wherein a second data line of the pixel is insulated from the gate line while crossing the gate line to receive a second data signal. The first thin film transistor receives the first data signal in response to the gate signal and outputs a first driving voltage to drive the first microshutter, and the second thin film transistor receives the second data signal in response to the gate signal and outputs a second driving voltage to drive the second microshutter.

According to another exemplary embodiment of the present invention, a display apparatus includes a plurality of pixels. Each pixel includes a first microshutter responsive to a voltage, the first microshutter including a plurality of first sub-microshutters that are successively arranged and a second microshutter responsive to the voltage, the second microshutter including a plurality of second sub-microshutters that are successively arranged. When a preceding sub-microshutter in each of the first and second sub-microshutters is closed in response to the voltage, a succeeding sub-microshutter in each of the first and second sub-microshutters is connected with the preceding sub-microshutter.

The display apparatus may further include a first thin film transistor and a second thin film transistor, the first microshutter is connected to the first thin film transistor, and the second microshutter is connected to the second thin film transistor.

Each of the pixels further includes a gate line receiving a gate signal, a first data line insulated from the gate line while crossing the gate line to receive a first data signal, and a second data line insulated from the gate line while crossing the gate line to receive a second data signal, the first thin film transistor is connected to the gate line and the first data line, and the second thin film transistor is connected to the gate line and the second data line.

The succeeding sub-microshutter of the first sub-microshutters has a size two times larger than a size of the preceding sub-microshutter of the first sub-microshutters, and the preceding sub-microshutter of the second sub-microshutters has a size two times larger than a size of the succeeding sub-microshutter. A number of the first sub-microshutters may be different from a number of the second sub-microshutters.

According to the above, the microshutter includes the sub-microshutters that spatially divide the pixel and the sub-microshutters are operated during different time periods. Thus, various gray scales may be displayed without increasing of the number of the microshutters or the sub-microshutters.

In addition, since various gray scales may be displayed even though the number of opens and closes is reduced, malfunction of the sub-microshutters may be prevented.

BRIEF DESCRIPTION OF THE DRAWINGS

Embodiments of the present invention will become readily apparent by reference to the following detailed description when considered in conjunction with the accompanying drawings wherein.

DETAILED DESCRIPTION OF EXEMPLARY EMBODIMENTS

Hereinafter, exemplary embodiments of the present invention will be explained in detail with reference to the accompanying drawings. In explanation of embodiments of the present invention, each sub-microshutter may be referred to as a preceding sub-microshutter or a succeeding sub-microshutter according to its operation order in response to a driving power source. In other words, a sub-microshutter is operated in response to the driving power source earlier than others may be referred to as the preceding sub-microshutter, and a sub-microshutter is operated in response to the driving power source later than the preceding sub-micrometer may be referred to as the succeeding sub-microshutter. Like numbers refer to like elements throughout. As used herein, the term "and/or" includes any and all combinations of one or more of the associated listed items.

Figure 1:
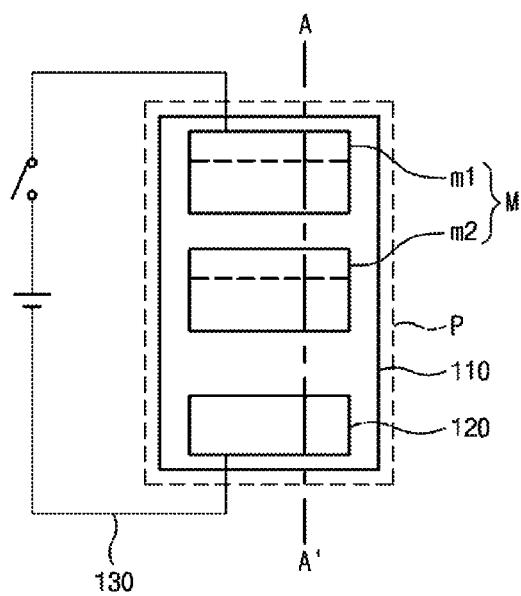
FIG. 1 is a plan view showing a display apparatus according to an exemplary embodiment of the present invention.
Figure 2:
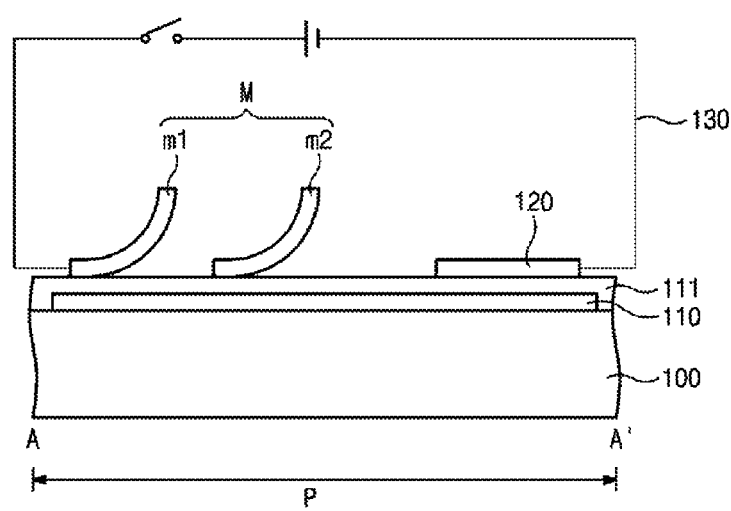
FIG. 2 is a sectional view taken along a line A-A' of FIG. 1.

FIG. 1 is a plan view showing a display apparatus according to an exemplary embodiment of the present invention. FIG. 2 is a sectional view taken along a line A-A' of FIG. 1. According to an exemplary embodiment, the display apparatus may include a plurality of pixels; herein one pixel will be described as a representative pixel since the pixels have the same structure and function.

Referring to FIGS. 1 and 2, a pixel includes a fixed electrode 110, a counter electrode 120, a microshutter M, and a driving power source 130. The fixed electrode 110, the counter electrode 120, and the microshutter M are formed in a pixel area P of a first substrate 100.

The substrate 100 may include a transparent insulating material, such as glass, plastic, etc.

The fixed electrode 110 is electrically isolated and may include a conductor such as metal. In an implementation of the pixel using electrostatic force, the fixed electrode 110 may be a material other than metal that induces electrostatic charges. Accordingly, various materials, for example, indium tin oxide ITO, indium zinc oxide IZO, zinc oxide ZnO, doped silicon, conductive polymer, etc., may be used as the electrode material for the fixed electrode 110. Particularly, if the transparent material, such as ITO, IZO, etc., is used as the electrode material, a measure of a light transmission of the substrate 100 may be more improved as compared to when opaque conductive materials are used as the electrode material.

The microshutter M and the counter electrode 120 are disposed above the fixed electrode 110. An insulating layer 111 interposes between the fixed electrode 110 and the microshutter M and the counter electrode 120. The insulating layer 111 may be an organic or inorganic material and include a single layer or a multilayer. When viewed in a plan view, the microshutter M and the counter electrode 120 overlap with the fixed electrode 110.

The microshutter M includes a plurality of sub-microshutters m1 and m2. The sub-microshutters m1 and m2 are arranged on the insulating layer 111 and are spaced apart from each other. The number of the sub-microshutters m1 and m2 may be varied according to a design of the pixel. In FIG. 1, two sub-microshutters m1 and m2 having the same size have been shown, and the two sub-microshutters m1 and m2 are referred to as first and second sub-microshutters m1 and m2, respectively, wherein the first sub-microshutter m1 is farther from the counter electrode 120 than the second sub-microshutter m2.

Each of the first and second sub-microshutters m1 and m2 has a substantially rectangular plate shape and includes an opaque material having elasticity. In detail, the first and second sub-microshutters m1 and m2 may be formed of metal, such as aluminum, gold, nickel, titanium, etc., or metal alloy thereof. In addition, each of the first and second sub-microshutters m1 and m2 may be formed of either a single layer or a multilayer. The first and second sub-microshutters m1 and m2 may be surface-treated to improve physical properties thereof, for example surface hardness, elastic coefficient. For example, an insulating coating may be formed on the surface of the first and second sub-microshutters m1 and m2 by using silicon oxide or aluminum oxide. Furthermore, in case of a transmission type display apparatus in which light transmits through the substrate 100 from a lower side of the substrate 100 to an upper side of the substrate 100, an anti-reflective (AR) material may be formed as the insulating coating, and a reflection improving material may be formed as the insulating coating.

The first and second sub-microshutters m1 and m2 may be flattened or bent according to the existence of electrostatic attraction between the fixed electrode 110 and the first and second sub-microshutters m1 and m2. That is, if the electrostatic attraction exists between the fixed electrode 110 and the first and second sub-microshutters m1 and m2, the first and second sub-microshutters m1 and m2 are completely flattened, and if the electrostatic attraction does not exist between the fixed electrode 110 and the first and second sub-microshutters m1 and m2, the first and second sub-microshutters m1 and m2 are bent.

As shown in FIG. 2, the first and second sub-microshutters m1 and m2 have a curved shape in cross-sectional view, but it should not be limited thereto or thereby. The first and second sub-microshutters m1 and m2 may have a spiral shape. To this end, a first end of each of the first and second sub-microshutters m1 and m2 is fixed to the insulating layer 111 and a second end of each of the first and second sub-microshutters m1 and m2 is separable from the insulating layer 111.

Figure 3A:
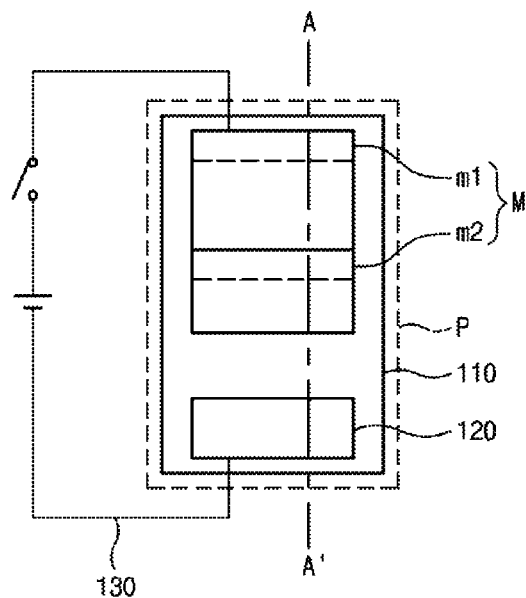
FIG. 3A is a plan view showing a display apparatus in which a first sub-microshutter is closed.
Figure 3B:
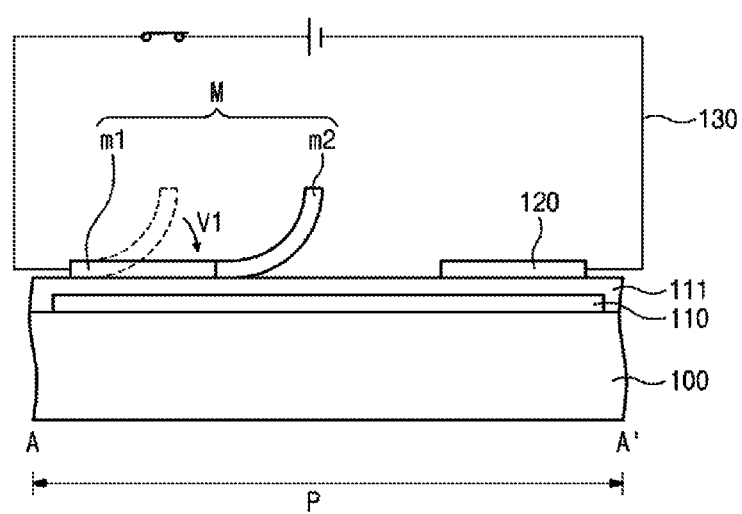
FIG. 3B is a sectional view taken along a line A-A' of FIG. 3A.
Figure 4A:
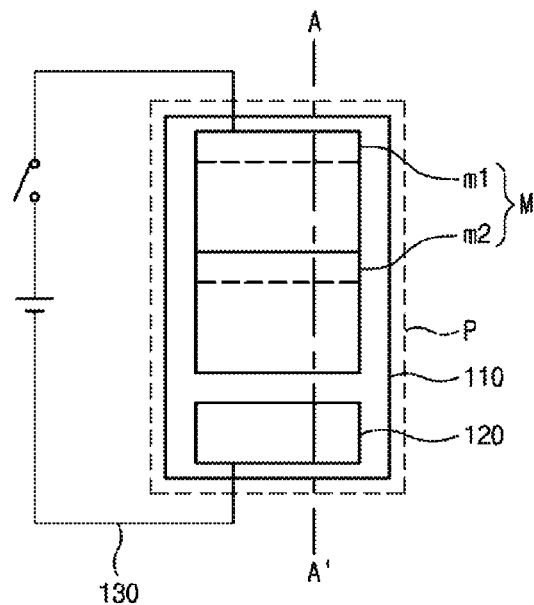
FIG. 4A is a plan view showing a display apparatus in which first and second sub-microshutters are closed.
Figure 4B:
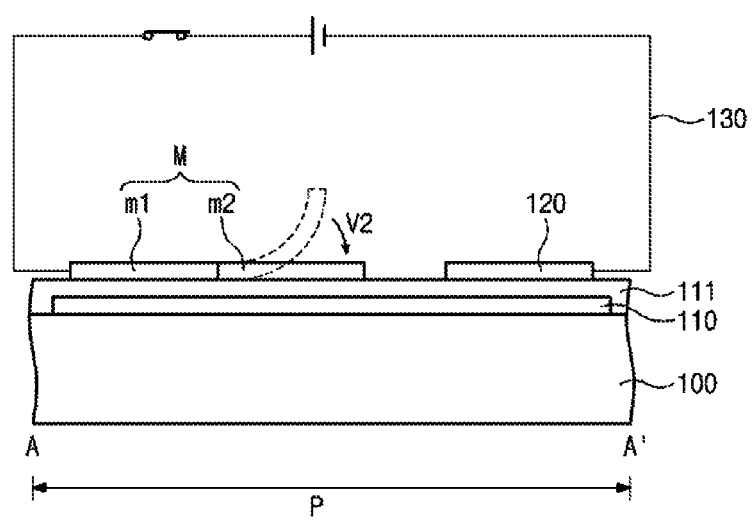
FIG. 4B is a sectional view taken along a line A-A' of FIG. 4A.

FIG. 3A is a plan view showing a display apparatus in which a first sub-microshutter is closed, FIG. 3B is a sectional view taken along a line A-A' of FIG. 3A. FIG. 4A is a plan view showing a display apparatus in which first and second sub-microshutters are closed, and FIG. 4B is a sectional view taken along a line A-A' of FIG. 4A.

Referring to FIGS. 3A, 3B, 4A, and 4B, the first sub-microshutter m1 and the counter electrode 120 are connected to the driving power source 130, and the second sub-microshutter m2 is not connected to the driving power source 130.

When a first voltage V1 is applied to the first sub-microshutter m1 and the counter electrode 120, electrostatic induction occurs between the counter electrode 120 and the fixed electrode 110 and between the counter electrode 120 and the first sub-microshutter m1, so that an attraction occurs between the first sub-microshutter m1 and the fixed electrode 110. Thus, the second end of the first sub-microshutter m1, which is initially spaced apart from the insulating layer 111, is drawn towards the insulating layer 111. As a result, the first sub-microshutter m1 is flattened to cover a portion of the display area P, thereby blocking a portion of the light passing through the pixel area P.

When the first sub-microshutter m1 is closed, the second end of the first sub-microshutter m1 makes contact with or overlaps with the first end of the second sub-microshutter m2, so that the firs sub-microshutter m1 may be electrically connected to the second sub-microshutter m2.

When a second voltage V2 obtained by increasing the first voltage V1 is applied to the second sub-microshutter m2 through the first sub-microshutter m1 after the first sub-microshutter m1 makes contact with the second sub-microshutter m2, the second sub-microshutter m2 is flattened such that the second end of the second sub-microshutter m2 makes contact with the insulating layer P, thereby covering a portion of the pixel area P. Accordingly, the second sub-microshutter m2 may block a portion of the light passing through the pixel area P.

When the voltages (e.g., the first and second voltages V1 and V2) are not applied to the counter electrode 120 and the first and second sub-microshutters V1 and V2, the second end of each of the first and second sub-microshutters m1 and m2 returns to an open position by elasticity thereof. The second sub-microshutter m2 may be electrically connected to the driving power source 130 when the first sub-microshutter m1 is closed.

According to an exemplary embodiment, the first voltage V1 applied to control the first sub-microshutter m1 has a voltage level different from a voltage level of the second voltage V2 applied to control the second sub-microshutter m2. In detail, the voltage level of the second voltage V2 is larger than the voltage level of the first voltage level V1.

Hereinafter, operations of the first and second sub-microshutters m1 and m2 will be described in detail.

If a negative (−) voltage is applied to the counter electrode 120 and a positive (+) voltage is applied to the first sub-microshutter m1, positive electric charges are induced to a first portion of the fixed electrode 110 about the counter electrode 120, and negative electric charges are induced to a second portion of the fixed electrode 110 about the first sub-microshutter m1. When capacitance between the counter electrode 120 and the fixed electrode 110 is larger than capacitance between the first sub-microshutter m1 and the fixed electrode 110, the voltage is diverted to first sub-microshutter m1 and the fixed electrode 110. The counter electrode 120 is positioned nearer the fixed electrode 110 than the first sub-microshutter m1 in which the second end is separated from the insulating layer 111 and the overlapped area between the counter electrode 120 and the fixed electrode 110 is larger than the overlapped area between the first sub-microshutter m1 and the fixed electrode 110, so that the capacitance between the fixed electrode 110 and the counter electrode 120 is greater than the capacitance between the fixed electrode 110 and the first sub-microshutter m1. Accordingly, the electrostatic force occurs between the first sub-microshutter m1 and the fixed electrode 110 due to the electrostatic induction, thus the first sub-microshutter m1 moves to the insulating layer 111.

When the voltage divided to the first sub-microshutter m1 and the fixed electrode 110 reaches to a pull-in voltage after the first voltage V1 is applied to the first sub-microshutter m1 and the counter electrode 120, the first sub-microshutter m1 completely is drawn towards the insulating layer 111 and is connected to the second sub-microshutter m2. Thus, the capacitance between the first sub-microshutter m1 and the fixed electrode 110 increases and the voltage diverted to the first sub-microshutter m1 and the fixed electrode 110 decreases. As a result, the first sub-microshutter m1 may be maintained in a flat state, and the second sub-microshutter m2, having an open state, and the fixed electrode 110 are maintained with low capacitance.

When the second voltage V2, obtained by increasing the first voltage V1, is applied to the first and second sub-microshutters m1 and m2 and the counter electrode 120, the second sub-microshutter m2 is drawn towards the insulating layer 111 due to the electrostatic force between the second sub-microshutter m2 and the fixed electrode 110. When the voltage applied to the first and second sub-microshutters m1 and m2 and the counter electrode 120 increases to a predetermined level, the voltage diverted to the first and second sub-microshutters m1 and m2 and the fixed electrode 110 reaches the pull-in voltage. Thus, the second sub-microshutter m2 is drawn towards the insulating layer 111 to have a flat state to cover a portion of the display area P. In addition, the capacitance between the second sub-microshutter m2 and the fixed electrode 110 increases, thereby causing a decrease in the voltage diverted to the second sub-microshutter m2 and the fixed electrode 110. Consequently, the second sub-microshutter m2 may be maintained in the flat state.

When the voltage applied to the first and second sub-microshutters m1 and m2 and the counter electrode 120 is reduced, each of the first and second sub-microshutters m1 and m2 returns to an open position by the elasticity thereof.

According to an exemplary embodiment, the microshutter M including two sub-microshutters m1 and m2 has been described, but the number of the sub-microshutters should not be limited thereto or thereby. That is, a microshutter including three sub-microshutters or more can be operated by the same method as described above.

Each of the sub-microshutters having the above-described structure may be closed or opened to display various gray scales.

Figure 5:
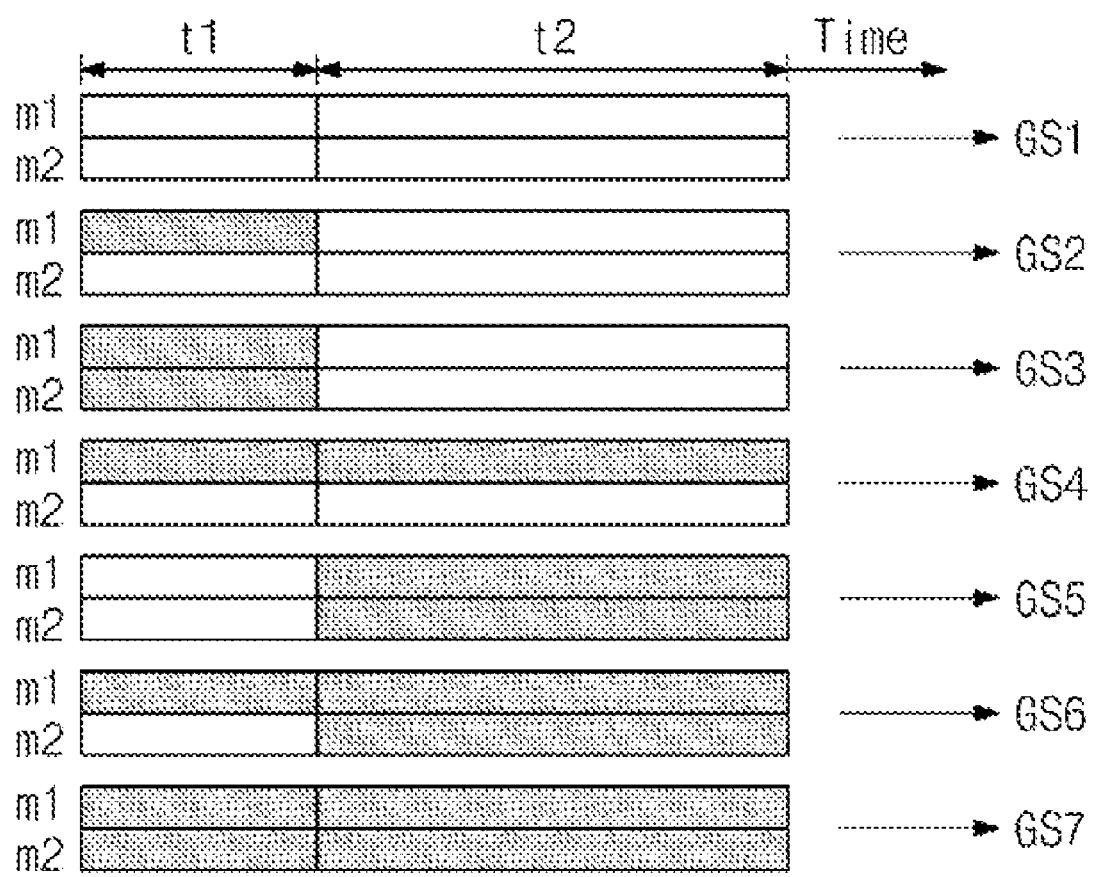
FIG. 5 is a view showing gray scales provided by the display apparatus of FIG. 1.

FIG. 5 is a view showing gray scales provided by the display apparatus of FIG. 1. In other words, FIG. 1 shows gray scales that may be displayed by dividing a unit time interval during which each of the sub-microshutters of the microshutter M is operated in a 2-bit operation.

According to an exemplary embodiment, the term "unit time interval" means a time interval that is predetermined to display one gray scale, and the term "bits" means the number of times the microshutter M is closed or opened. For example, in a case of the 2-bit division operation, each of the sub-microshutters is closed or opened two times. That is, when the unit time interval is divided into a first time interval t1 and a second time interval t2, each of the sub-microshutters is closed or opened during the first time interval t1 and each of the sub-microshutters is closed or opened during the second time interval t2. According to an exemplary embodiment, the second time interval t2 is about two times larger than the first time interval t1.

Referring to FIG. 5, the microshutter M is opened or closed during the first time interval t1 and then is opened or closed during the second time interval t2. Since the microshutter M includes the first sub-microshutter m1 and the second sub-microshutter m2, the open operation and the close operation of each of the first and second sub-microshutters m1 and m2 depends on the voltage applied to the microshutter M. In addition, since an amount of light transmitted through the pixel area P varies according to the open operation and the close operation of the first and second sub-microshutters m1 and m2, each pixel may display various gray scales. According to an exemplary embodiment, each pixel may display seven gray scales from 1 gray scale GS1 to 7 gray scale GS7.

In particular, when no voltage is applied to the first and second sub-microshutters m1 and m2 during the unit time interval, the first and second sub-microshutters m1 and m2 are opened during the unit time interval, thereby obtaining gray scale 1 (GS1). When the first voltage V1 is applied to the first sub-microshutter m1 during the first time interval t1 to close the first sub-microshutter m1 and the first voltage V1 is removed during the second time interval t2 to open the first and second sub-microshutters m1 and m2, gray scale 2 (GS2) may be obtained. In order to obtain gray scale 3 (GS3), the first and second voltages V1 and V2 are applied substantially simultaneously during the first time interval t1 to close the first and second sub-microshutters m1 and m2 and the first and second voltages V1 and V2 are removed to open the first and second sub-microshutters m1 and m2. When the first voltage V1 is applied to the first sub-microshutter m1 during the first time interval t1 and the second time interval t2 to close only the first sub-microshutter m1, gray scale 4 (GS4) may be obtained. In addition, in a case where the first and second voltages V1 and V2 are not applied during the first time interval t1 to open the first and second sub-microshutters m1 and m2 and the first and second voltages V1 and V2 are applied during the second time interval t2 to close the first and second sub-microshutters m1 and m2, thus gray scale 5 (GS5) may be obtained. When the first voltage V1 is applied during the first time interval t1 to close the first sub-microshutter m1 and the first and second voltages V1 and V2 are applied during the second time interval t2 to close the first and second sub-microshutters m1 and m2, gray scale 6 (GS6) may be obtained. When the first and second voltages V1 and V2 are applied during the first and second time intervals t1 and t2 to close the first and second sub-microshutters m1 and m2 during the first and second time intervals t1 and t2, gray scale 7 (GS7) may be obtained. As described above, when controlling the open or close state of each of the first and second sub-microshutters m1 and m2 during the first and second time intervals t1 and t2, each pixel may display seven gray scales GS1~GS7.

As described above, in a case that both space division and time division operations are applied to control the first and second sub-microshutters m1 and m2, the number of gray scales displayed through the pixel is greater than the number of gray scales displayed by using only the space division operation without the time division operation. If the time division operation is not applied to control the first and second sub-microshutters m1 and m2 having the same size, each pixel may display only three gray scales, for example, the first and second sub-microshutters m1 and m2 are opened, the first and second sub-microshutters m1 and m2 are closed, or one of the first and second sub-microshutters m1 and m2 is opened and remaining sub-microshutter is closed.

According to an exemplary embodiment, the 2-bit time division operation has been described, but it should not be limited thereto or thereby. For example, the unit time interval may be divided into three time intervals (e.g. 3-bit operation), and the divided time intervals may have different time interval, so that the number of gray scales displayed through the pixels may increase.

Figure 6:
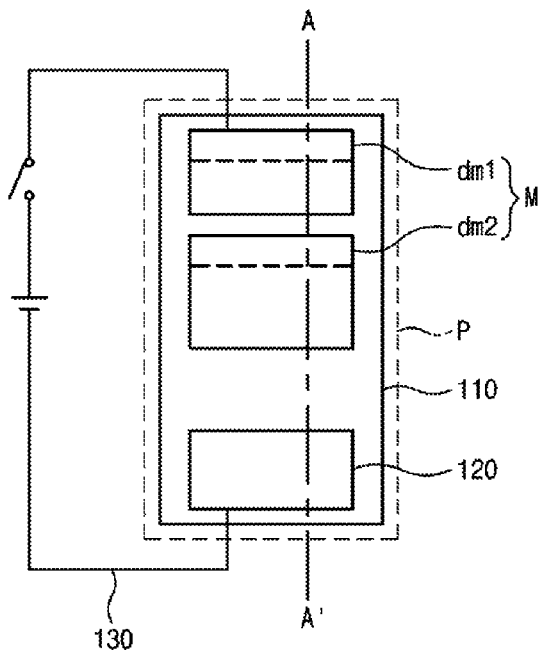
FIG. 6 is a plan view showing a display apparatus according to another exemplary embodiment of the present invention.
Figure 7:
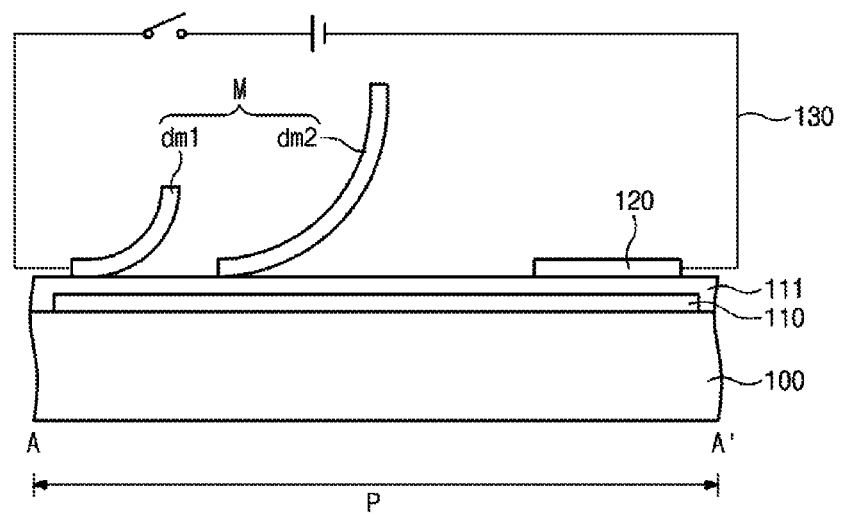
FIG. 7 is sectional view taken along a line A-A' of FIG. 6.

FIG. 6 is a plan view showing a display apparatus according to another exemplary embodiment of the present invention, and FIG. 7 is sectional view taken along a line A-A' of FIG. 6. According to an exemplary embodiment, the display apparatus may include a plurality of pixels, with one pixel being described as a representative pixel since the pixels have the same structure and function. According to an exemplary embodiment, for the convenience of explanation, the same reference numerals denote the same elements in the first exemplary embodiment, and thus detailed descriptions of the same elements will be omitted.

Referring to FIGS. 6 and 7, a microshutter M arranged in a pixel area P includes two sub-microshutters dm1 and dm2 having different sizes from each other. The microshutter M includes a first sub-microshutter dm1 and a second sub-microshutter dm2 having a size different from a size of the first sub-microshutter dm1. In a case that the open and close states of the pixel area P are controlled by the two sub-microshutters dm1 and dm2 having the different sizes, the number of gray scales displayed through the pixel area P may be increased.

According to an exemplary embodiment, the size of the second sub-microshutter dm2 is about two times larger than the size of the first sub-microshutter dm1. As described above, in a case that one microshutter includes multiple sub-microshutters having the different sizes from each other, various gray scales may be displayed through the pixel area P by combination of the open and close states of the sub-microshutters as shown in FIG. 7. However, the size of the sub-microshutters should not be limited thereto or thereby and may vary for different implementations.

Figure 8:
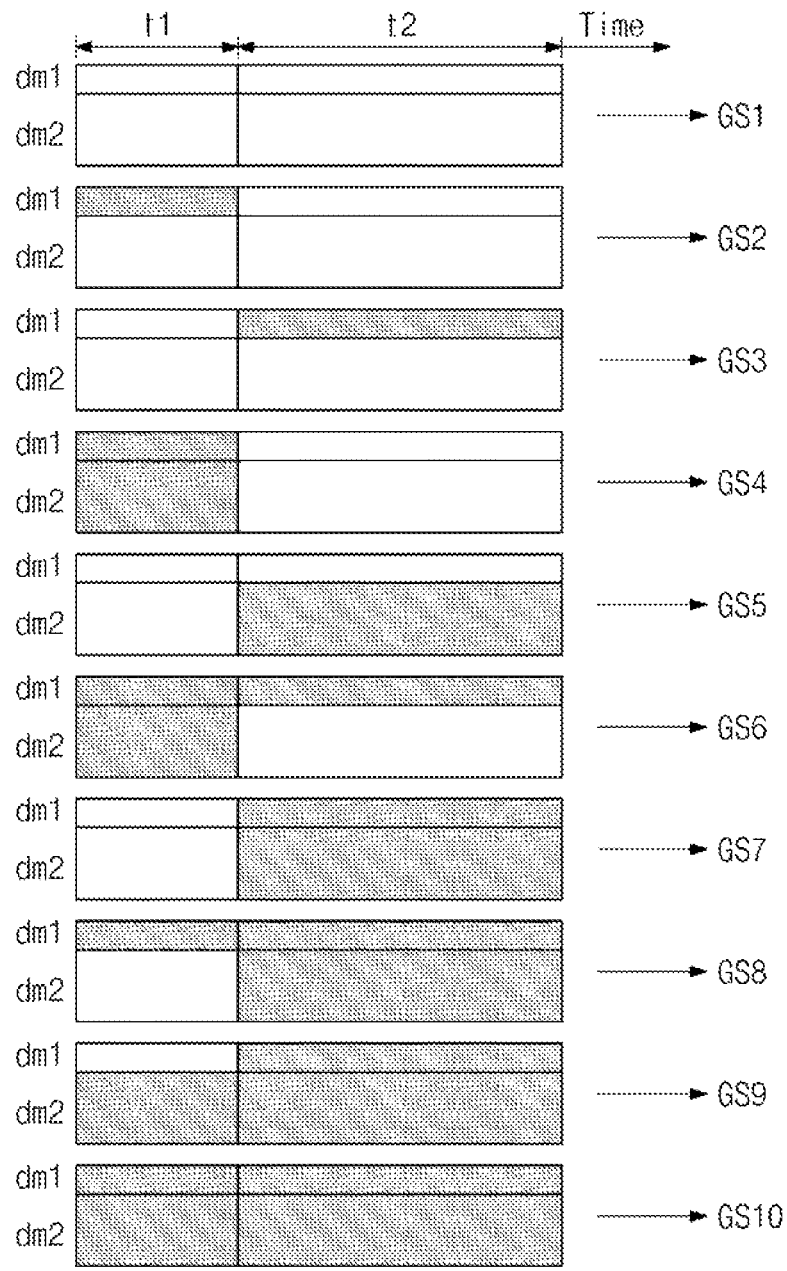
FIG. 8 is a view showing gray scales provided by the display apparatus of FIG. 6.

FIG. 8 is a view showing gray scales achievable by the display apparatus of FIG. 6. In other words, FIG. 8 shows gray scales that may be displayed by dividing a unit time interval during 2-bit operation of each of the sub-microshutters of the microshutter M.

Referring to FIG. 8, the microshutter M is opened or closed during a first time interval t1 and is opened or closed during a second time interval t2 later than the first time interval t1. Since the microshutter M includes the first sub-microshutter dm1 and the second sub-microshutter dm2, the open state and the close state of each of the first and second sub-microshutters dm1 and dm2 depends on the voltage applied to the microshutter M. In addition, since an amount of light transmitted through the pixel area P varies according to the open state and the close state of the first and second sub-microshutters dm1 and dm2, each pixel may display various gray scales. According to an exemplary embodiment, theoretically, each pixel may display ten gray scales from gray scale 1 (GS1) to gray scale 10 (GS10).

Since gray scale 5 (GS5) and gray scale 9 (GS9) represent a state that the first sub-microshutter dm1 is opened and only the second sub-microshutter dm2 is closed, gray scales 5 and 9 (GS5 and GS9) are not realized. Thus, each pixel according to the second exemplary embodiment may display eight gray scales GS1~GS-4, GS6~GS-8 and GS10.

If the number of microshutters that are independently operated is the same as the number of sub-microshutters, the gray scales (e.g., gray scales 5 and 9 (GS5 and GS9)) that are not realized may be prevented from occurring as shown in FIG. 8.

Figure 9:
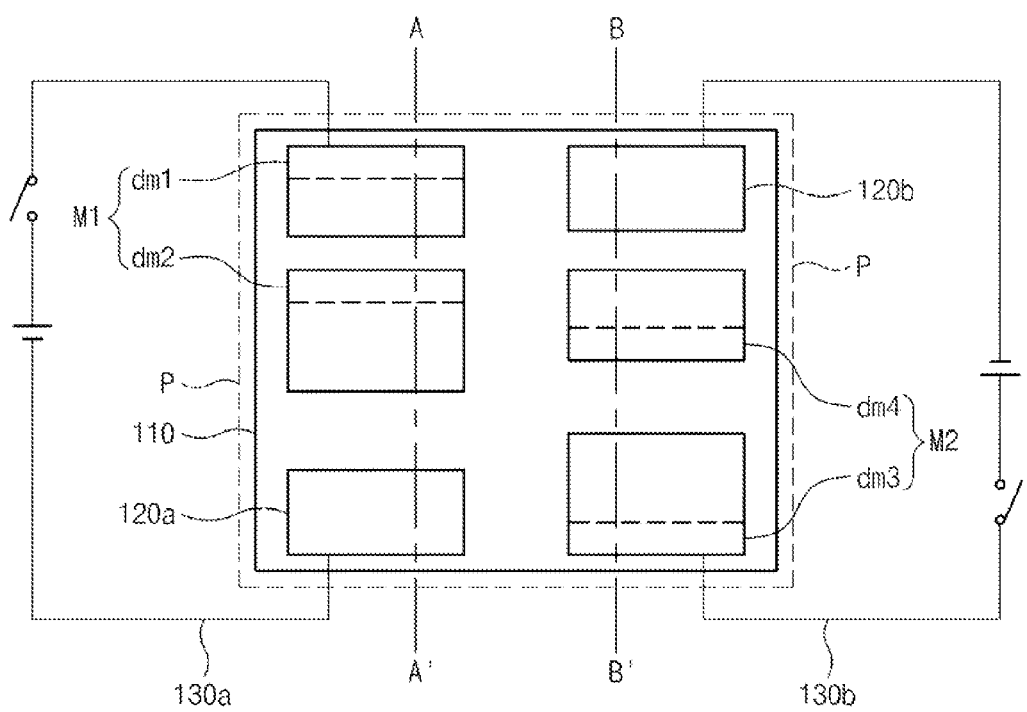
FIG. 9 is a plan view showing a display apparatus according to a further exemplary embodiment of the present invention.
Figure 10A:
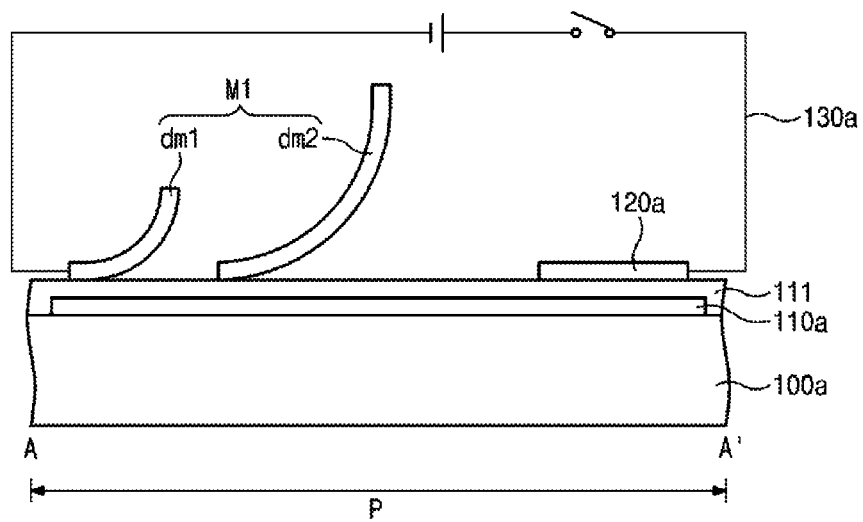
FIG. 10A is a sectional view taken along a line A-A' of FIG. 9.
Figure 10B:
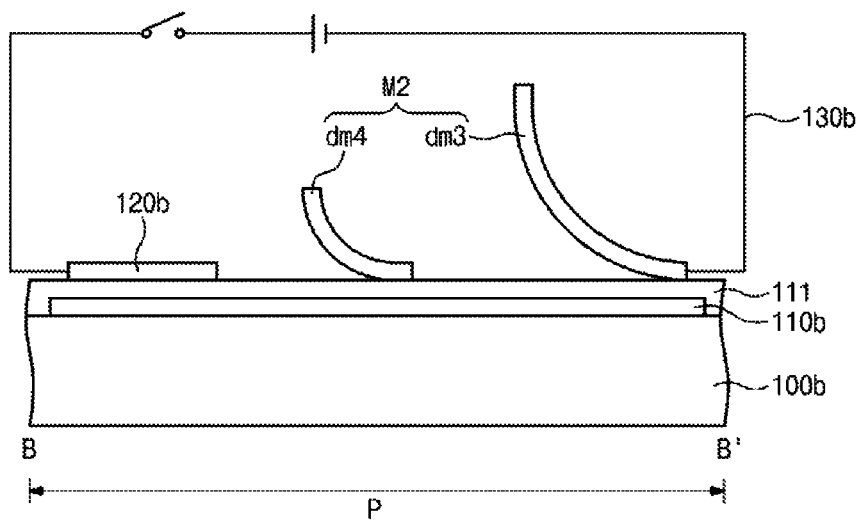
FIG. 10B is a sectional view taken along a line B-B' of FIG. 9.

FIG. 9 is a plan view showing a display apparatus according to a further exemplary embodiment of the present invention, FIG. 10A is a sectional view taken along a line A-A' of FIG. 9, and FIG. 10B is a sectional view taken along a line B-B' of FIG. 9. FIG. 9 shows two independently operated microshutters and two independently operated sub-microshutters per microshutter. In FIGS. 9, 10A and 10B, for the convenience of explanation, one pixel will be described as a representative pixel since the pixels have the same structure and function.

Referring to FIGS. 9, 10A, and 10B, a display apparatus includes a first microshutter M1 and a second microshutter M2. The first and second microshutters M1 and M2 are independently operated. The first microshutter M1 includes a first sub-microshutter dm1, a second sub-micrometer dm2 having a different size from that of the first sub-microshutter dm1, and a first counter electrode 120a. The second microshutter M2 includes a third sub-microshutter dm3, a fourth sub-microshutter dm4 having a different size from that of the third sub-microshutter dm3, and a second counter electrode 120b.

In a case that a grey scale state of the pixel area P is controlled by open and close states of the first and second sub-microshutters dm1 and dm2 having the different sizes and the third and fourth sub-microshutters dm3 and dm4 having the different sizes, the number of gray scales displayed through the pixel area P may be increased.

According to an exemplary embodiment, the size of the second sub-microshutter dm2 is about two times larger than the size of the first sub-microshutter dm1, and the third sub-microshutter dm3 is about two times larger than the size of the fourth sub-microshutter dm4. That is, in a case of the first microshutter M1, the size of the first sub-microshutter dm1, which is farther apart from the first counter electrode 120a than the second sub-microshutter dm2, is smaller than the size of the second sub-microshutter dm2. In a case of the second microshutter M2, the size of the fourth sub-microshutter dm4, which is nearer to the second counter electrode 120b than the third sub-microshutter dm3, is smaller than the size of the third sub-microshutter dm3.

Thus, when a voltage is applied to the first microshutter M1, the first sub-microshutter dm1 is closed first and then the second sub-microshutter dm2, being about two times larger than that of the first sub-microshutter dm2, is closed. Further, when a voltage is applied to the second microshutter M2, the third sub-microshutter dm3 is closed and then the fourth sub-micrometer dm4, being about two times smaller than that of the third sub-microshutter dm3, is closed.

Figure 11:
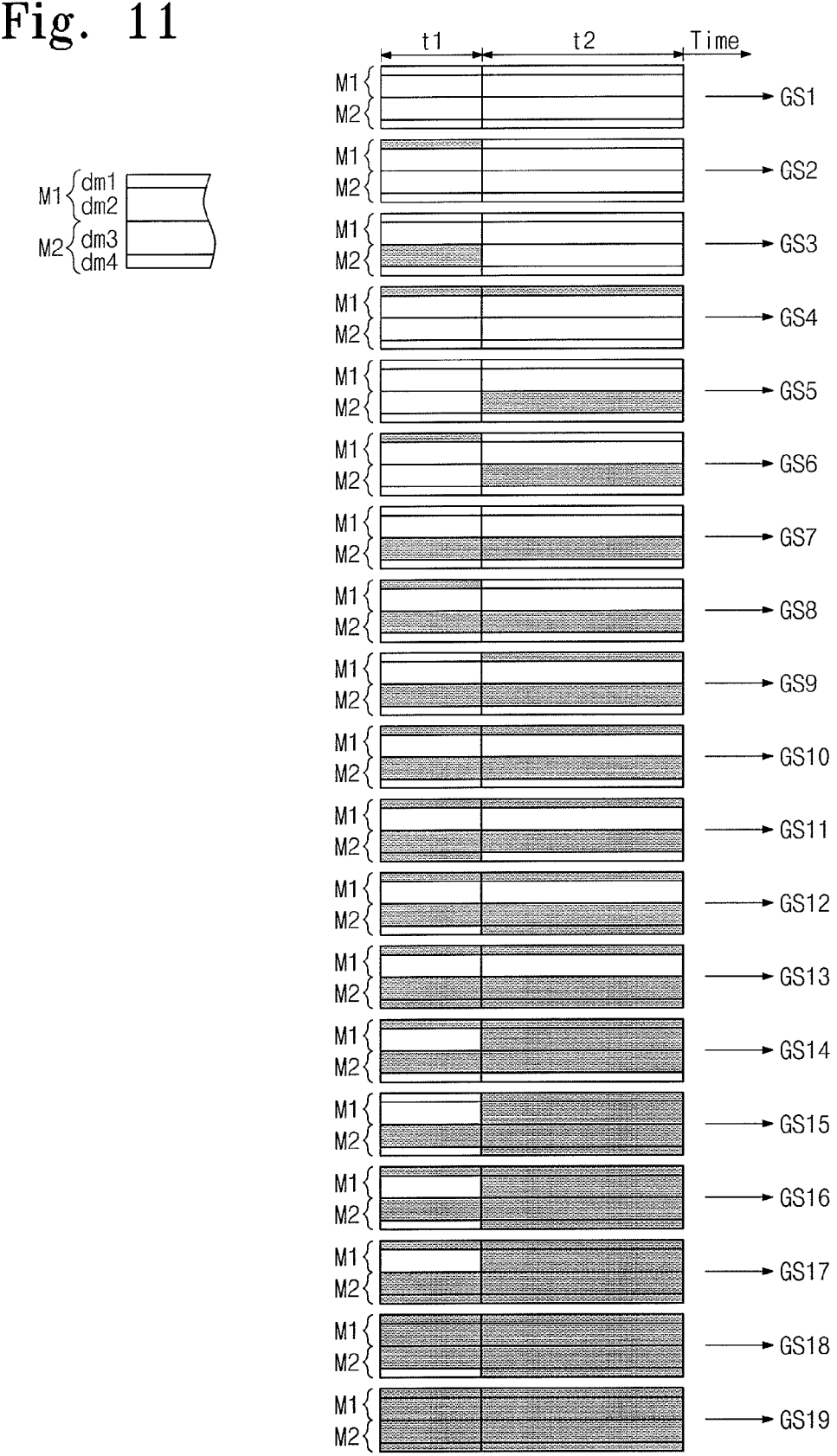
FIG. 11 is a view showing gray scales provided by the display apparatus of FIG. 9.

FIG. 11 is a view showing gray scales provided by the display apparatus of FIG. 9. In other words, FIG. 11 shows gray scales that may be displayed by dividing a unit time interval during 2-bit operation of each of the microshutters M1 and M2.

Referring to FIG. 11, each of the first and second microshutters M1 and M2 is opened or closed during a first time interval t1 and is opened or closed during a second time interval t2. The open state and the close state of each of the first and second microshutters M1 and M2 depends on the voltage applied thereto. In addition, since the first microshutter M1 includes the first and second sub-microshutters dm1 and dm2 and the second microshutter M2 includes the third and fourth sub-microshutters dm3 and dm4, the amount of light transmitted through the pixel area P varies according to the open state and the close state of the first to fourth sub-microshutters dm1, dm2, dm3 and dm4.

Accordingly, as shown in FIG. 11, each pixel may display 19 gray scales GS1~GS19. According to an exemplary embodiment, a driving power source is applied to every microshutter. In more detail, the first microshutter M1 is connected to a first driving power source 130a and a second microshutter M2 is connected to a second driving power source 130b. Thus, the number of gray scales displayed through the pixel area P may be increased.

Each of the first and second driving power sources 130a and 130b may be a thin film transistor.

Figure 12:
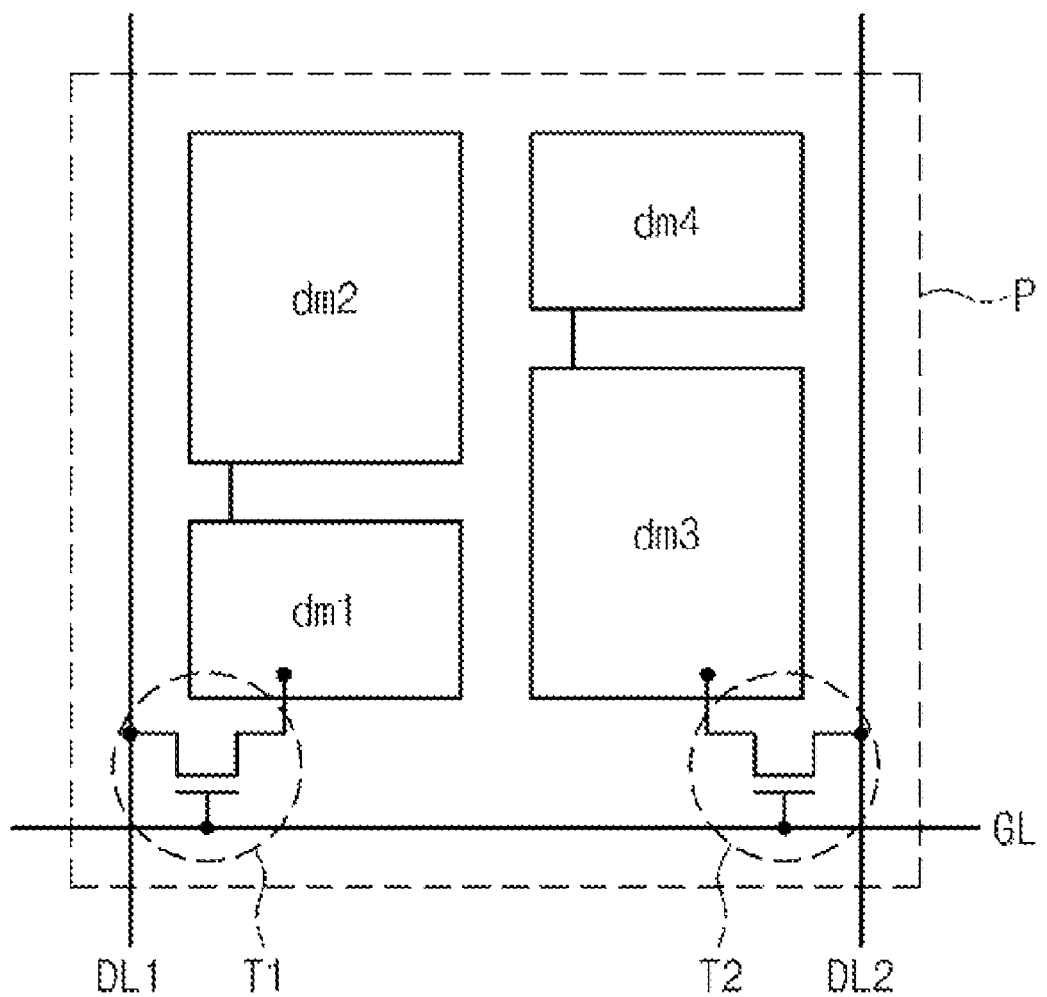
FIG. 12 is an equivalent circuit diagram showing the display apparatus of FIG. 9, to which a thin film transistor is applied as a driving power source.

FIG. 12 is an equivalent circuit diagram showing the display apparatus of FIG. 9, to which a thin film transistor is applied as a driving power source. The display apparatus includes plurality of pixels, but, for convenience, only one pixel has been shown in FIG. 12.

The first microshutter M1 is connected to a first thin film transistor T1 and the second microshutter M2 is connected to a second thin film transistor T2.

Referring to FIG. 12, the pixel includes a gate line GL and data lines DL1 and DL2.

The gate line GL receives a gate signal. The data lines DL1 and DL2 are insulated from the gate line GL while crossing with the gate line GL and include a first data line DL1 and a second data line DL2 substantially parallel to the first data line DL1. The first and second data lines DL1 and DL2 receive a first data signal and a second data signal, respectively.

The first thin film transistor T1 is electrically connected to the gate line GL and the first data line DL1. The first thin film transistor T1 is turned on in response to the gate signal provided through the gate line GL and outputs the first data signal provided through the first data line DL1 as a first driving voltage to drive the first microshutter M1. The first driving voltage may include a first voltage to drive the first sub-microshutter dm1 and a second voltage having different voltage level from the first voltage to drive the second sub-microshutter dm2.

The second thin film transistor T2 is electrically connected to the gate line GL and the second data line DL2. The second thin film transistor T2 is turned on in response to the gate signal provided through the gate line GL and outputs the second data signal provided through the second data line DL2 as a second driving voltage to drive the second microshutter M2. The second driving voltage may include a third voltage to drive the third sub-microshutter dm3 and a fourth voltage having different voltage level from the third voltage to drive the fourth sub-microshutter dm4.

As described above, the first and second microshutters M1 and M2 may be independently operated by using different thin film transistors and different data signals provided through different data lines.

Various gray scales may be displayed according to the number of the microshutters, the number of sub-microshutters, and the number of bits of the time division.

Assuming that each pixel of the display apparatus includes one microshutter including in sub-microshutters having the same size and being operated at N-bit time division, the number of the gray scales (referred to as "NOG") that may be displayed by the display apparatus is as following Equation 1.

$$NOG = m \times (2^N - 1) + 1 \qquad \text{Equation 1}$$

In addition, if each pixel of the display apparatus includes M microshutters each including m sub-microshutters having the size that is sequentially changed two times and being operated at N-bit time division, the number of the gray scales that may be displayed by the display apparatus is as following Equation 2.

$$NOG = m \times (2^M - 1) \times \sum_{t=1}^{N} 2^{t-1} + 1 \qquad \text{Equation 2}$$

Table below represents the number of gray scales displayed by the display apparatus using Equations 1 and 2 when the display apparatus is operated while varying the number of microshutters, the number of sub-microshutters, and the bits of time division. In Table 1, a first condition indicates that each pixel of the display apparatus includes one microshutter including sub-microshutters having the same size. The first condition satisfies Equation 1. A second condition indicates that each pixel of the display apparatus includes plurality of microshutters, which are independently operated, including sub-microshutters having different sizes. The second condition satisfies Equation 2.

TABLE

|  | Number of microshutters | Number of sub-microshutters | Time division | | | | | |
|---|---|---|---|---|---|---|---|---|
|  |  |  | 2-bit | 3-bit | 4-bit | 5-bit | 6-bit | 7-bit |
| First condition | 1 | 2 | 7 | 15 | 31 | 63 | 127 | 255 |
|  | 1 | 3 | 10 | 22 | 46 | 94 | 190 | 382 |
|  | 1 | 4 | 13 | 29 | 61 | 125 | 253 | 509 |
|  | 1 | 5 | 16 | 36 | 76 | 156 | 316 | 636 |
| Second condition | 2 | 2 | 19 | 43 | 91 | 187 | 379 | 763 |
|  | 3 | 3 | 64 | 148 | 316 | 652 | 1324 | 2668 |
|  | 4 | 4 | 181 | 421 | 901 | 1861 | 3781 | 7621 |
|  | 5 | 5 | 466 | 1086 | 2326 | 4806 | 9766 | 19686 |

As Table 1 shows, when the number of the sub-microshutters and the bits of the time division are increased, the number of gray scales displayed by the display apparatus is increased. That is, various gray scales, such as 64 gray scales, 128 gray scales, 256 gray scales, etc., may be displayed by adjusting the number of the microshutters independently operated, the number of sub-microshutters included in each microshutter, and the bits of the time division. For example, in the second condition, when the display apparatus including two microshutters each having two sub-microshutters is operated at 6-bit time division, the display apparatus may display 379 gray scales more than 256 gray scales. Also, under the second condition, when the display apparatus including three microshutters each having three sub-microshutters is operated at 4-bit time division, the display apparatus may display 316 gray scales Although exemplary embodiments of the present invention have been described, it is understood that the present invention should not be limited to exemplary embodiments but various changes and modifications can be made by one ordinary skilled in the art within the spirit and scope of the present invention as hereinafter claimed.

What is claimed is:

1. A method of driving a display apparatus including a plurality of pixels, the method comprising: applying voltages including a first voltage having a first level and a second voltage having a second level different from the first level, to a microshutter formed in each of the plurality of pixels and comprising a plurality of sub-microshutters to display one of a plurality of gray scales in a unit time interval, wherein the unit time interval includes a first time interval in which the first voltage is applied to the microshutter and a second time interval in which the second voltage is applied to the microshutter; wherein the applying voltages comprises: applying the first voltage to a preceding sub-microshutter of the plurality of sub-microshutters to close the preceding sub-microshutter such that the preceding sub-microshutter is connected with a succeeding sub-microshutter of the plurality of sub-microshutters; and applying the second voltage to the succeeding sub-microshutter through the preceding sub-microshutter connected with the succeeding sub-microshutter to close the succeeding sub-microshutter, and wherein the preceding sub-microshutter is operated earlier than the succeeding microshutter.

2. The method of claim 1, wherein the succeeding sub-microshutter is closed in response to the second voltage one of after and substantially simultaneously with the closing of the preceding sub-microshutter in response to the first voltage.

3. The method of claim 1, wherein the plurality of sub-microshutters have different sizes from each other.

4. The method of claim 1, wherein the succeeding sub-microshutter has a size about two times larger than a size of the preceding sub-microshutter.

5. The method of claim 1, wherein each pixel has a plurality of microshutters, and the plurality of microshutters have a first microshutter and a second microshutter, and the first microshutter and the second microshutter are independently operated during the predetermined different time periods.

6. The method of claim 5, wherein the first and second microshutters are independently operated by respective thin film transistors.

7. The method of claim 6, wherein the first microshutter comprises first sub-microshutters, the second microshutter comprises second sub-microshutters, and a number of the first sub-microshutters is equal to a number of the second sub-microshutters.

8. The method of claim 7, wherein a succeeding sub-microshutter of the first sub-microshutters has a size about two times larger than a size of a preceding sub-microshutter of the first sub-microshutters, and a preceding sub-microshutter of the second sub-microshutters has a size about two times larger than a size of a succeeding sub-microshutter.

9. The method of claim 6, wherein the first microshutter comprises first sub-microshutters, the second microshutter comprises second sub-microshutters, and a number of the first sub-microshutters is different from a number of the second sub-microshutters.

10. The method of claim 5, wherein the first microshutter is connected to a first thin film transistor, and the second microshutter is connected to a second thin film transistor.

11. A method of driving a display apparatus including a plurality of microshutters in each pixel, the method comprising:
applying voltages having different voltage levels to each microshutter during predetermined different time periods, each microshutter comprising a plurality of sub-microshutters, the voltage levels closing respective ones of the plurality of sub-microshutters thereby displaying one of a plurality of gray scales during a unit time period, and
wherein the plurality of sub-microshutters comprises at least two sub-microshutters, and one of the plurality of sub-microshutters operates after being connected to another one of the plurality of sub-microshutters.

12. The method of claim 11, wherein the plurality of microshutters comprises a first microshutter and a second microshutter,
and the first microshutter and the second microshutter of the pixel are independently operated by respective thin film transistors.

13. The method of claim 12, wherein the first and second microshutters are independently operated during the predetermined different time periods.

14. The method of claim 13, wherein the first microshutter is connected to a first thin film transistor, the second microshutter is connected to a second thin film transistor, the method comprises:
receiving a gate signal by a gate line of the pixel,
wherein a first data line of the pixel is insulated from the gate line while crossing the gate line to receive a first data signal, and
wherein a second data line of the pixel is insulated from the gate line while crossing the gate line to receive a second data signal;
receiving by the first thin film transistor the first data signal in response to the gate signal;
outputting by the first thin film transistor a first driving voltage to drive the first microshutter;
receiving by the second thin film transistor the second data signal in response to the gate signal; and
outputting by the second thin film transistor a second driving voltage to drive the second microshutter.

15. A display apparatus comprising:
a plurality of pixels, each pixel comprising:
a first microshutter responsive to a voltage, the first microshutter comprising a plurality of first sub-microshutters that are successively arranged; and
a second microshutter responsive to the voltage, the second microshutter comprising a plurality of second sub-microshutters that are successively arranged,
wherein, when a preceding sub-microshutter in each of the first and second sub-microshutters is closed in response to the voltage, and wherein
each of the first and second sub-microshutters have a preceding sub-microshutter and a succeeding sub-microshutter, and
the succeeding sub-microshutter operates after the succeeding sub-microshutter is connected with the preceding sub-microshutter.

16. The display apparatus of claim 15, further comprising a first thin film transistor and a second thin film transistor, wherein the first microshutter is connected to the first thin film transistor and the second microshutter is connected to the second thin film transistor.

17. The display apparatus of claim 16, wherein each of the pixels further comprises:
a gate line receiving a gate signal;
a first data line insulated from the gate line while crossing the gate line to receive a first data signal; and
a second data line insulated from the gate line while crossing the gate line to receive a second data signal, the first thin film transistor is connected to the gate line and the first data line, and the second thin film transistor is connected to the gate line and the second data line.

18. The display apparatus of claim 15, wherein the succeeding sub-microshutter of the first sub-microshutters has a size about two times larger than a size of the preceding sub-microshutter of the first sub-microshutters, and the preceding sub-microshutter of the second sub-microshutters has a size about two times larger than a size of the succeeding sub-microshutter.

19. The display apparatus of claim 15, wherein a number of the first sub-microshutters is different from a number of the second sub-microshutters.

* * * * *